United States Patent [19]

Sutherland

[11] 3,932,834

[45] Jan. 13, 1976

[54] SEISMIC TRANSDUCER ASSEMBLY FOR MARSHY TERRAINS

[75] Inventor: Byron C. Sutherland, Pearland, Tex.

[73] Assignee: Walker-Hall-Sears, Inc., Houston, Tex.

[22] Filed: Oct. 23, 1973

[21] Appl. No.: 408,772

[52] U.S. Cl.................. 340/7 R; 181/122; 340/8 R
[51] Int. Cl................................................ G01v 1/16
[58] Field of Search........ 181/122; 340/17, 8 R, 7 R

[56] References Cited
UNITED STATES PATENTS

| | | | |
|---|---|---|---|
| 2,783,298 | 2/1957 | Brown et al. ........................... | 340/17 |
| 3,263,208 | 7/1966 | Douglas et al. ...................... | 340/8 R |
| 3,332,057 | 7/1967 | Pavey, Jr............................... | 340/7 R |
| 3,739,326 | 6/1973 | Kerr et al.............................. | 340/17 |

Primary Examiner—Maynard R. Wilbur
Assistant Examiner—H. A. Birmiel
Attorney, Agent, or Firm—Michael P. Breston

[57] ABSTRACT

This invention relates to seismic transducer assemblies for converting compressional wave motion or acoustic energy into electric energy in a fluid medium such as is encountered in marshy terrains. It also relates to an improved method of manufacturing such transducers. The transducer includes a rigid hollow casing having a conical end cap to facilitate planting the casing into the ground. At least one pressure transducer element is mounted in the casing. A water-impervious, pressure-transmitting, insulating core fills the casing's cavity. The material rigidly holds the transducer in place and allows transfer of pressure energy from the fluid medium in which the transducer assembly is submerged, to the inner surfaces of the transducer element.

3 Claims, 2 Drawing Figures

SEISMIC TRANSDUCER ASSEMBLY FOR MARSHY TERRAINS

BACKGROUND OF THE INVENTION

Seismic pressure transducer assemblies adapted for marshy terrains are known and widely used. One such pressure transducer assembly comprises a rigid cylindrical perforated casing defining an inner cavity. An air-filled bag or bladder containing a pressure transducer element is mounted inside the cavity. The bag is made from a sound-transmitting material such as rubber. When the transducer assembly is submerged in shallow water or marshy ground, the water fills the cavity through the perforations of the casing. Seismic pressure waves from the liquid are transmitted to the pressure transducer through the wall of the bag and the air therein.

Such known seismic transducer assemblies have certain drawbacks chief among which are: the wall of the rubber bladder has to be relatively thin in order not to unduly attenuate the arriving seismic pressure waves. But, a thin-walled bladder is susceptible of becoming easily damaged by sharp objects piercing through the perforations of the casing. When the bladder becomes ruptured, the air therefrom escapes, water enters the inner volume of the bladder and damages the transducer element. Another serious problem with such prior art transducer assemblies is that mud enters the cavity of the casing and forms a "cake" around the bladder, thereby preventing effective acoustic coupling between the external fluid medium and the transducer element.

SUMMARY OF THE INVENTION

The transducer assembly of this invention comprises a casing defining a cavity and having sound-transmitting windows for acoustically coupling the cavity with a fluid medium surrounding the casing. At least one pressure transducer element or hydrophone is mounted inside the cavity. A flexible cable containing at least a pair of electric conductors extends through a center opening of an end cap. The cable is electrically connected to the hydrophone. A core completely fills the cavity and rigidly supports the transducer element in place. A bottom end cap has a conical configuration to allow the unit to be inserted into the ground. The core's material transmits the pressure wave energy from the fluid medium to the transducer element.

DESCRIPTION OF THE PREFERRED EMBODIMENT

Figure 1:
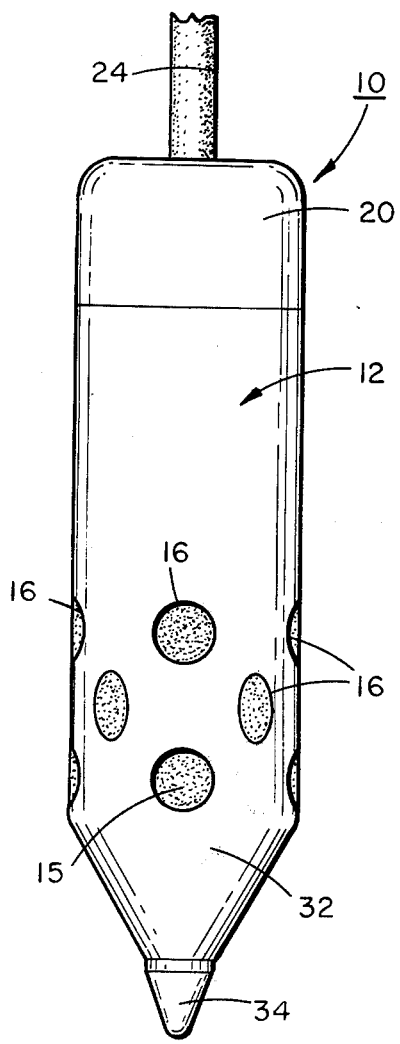
FIG. 1 is a perspective view in elevation of the transducer assembly of this invention.
Figure 2:
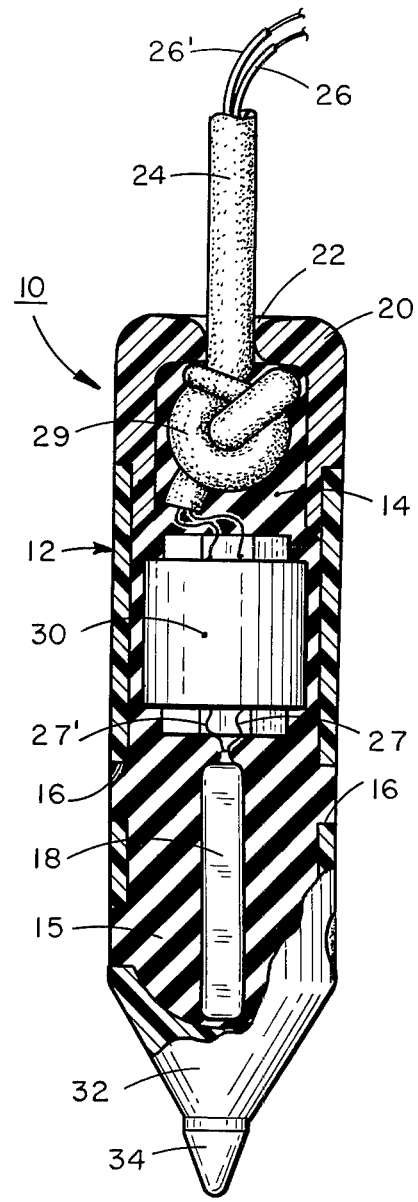
FIG. 2 is a partly-sectional view of the transducer assembly shown in FIG. 1.

The transducer assembly, generally designated as 10, comprises a hollow cylindrical casing 12 made of a rigid material which could be metal or plastic. Casing 12 defines an inner cavity 14 and a plurality of sound-transmitting windows 16. In the embodiment shown, each window is a circular opening through the cylindrical wall of the casing.

Mounted inside cavity 14 is a conventional pressure transducer element or hydrophone 18 which may be of the ceramic or crystal type. Casing 12 has an upper end cap 20 defining a center opening 22 for receiving an electric cable 24 having at least a pair of electric conductors 26—26'.

A strain cord portion 29 inside the top end cap prevents tension to be transmitted by cable 24 to the hydrophone.

While in the embodiment shown it is desired to connect the output terminals 27—27' from the hydrophone 18 to the electric conductors 26—26' through a transformer 30, the transformer can be eliminated or additional elements, such as pre-amplifiers may be coupled to the output of the transformer.

Casing 12 is provided with a conically-shaped bottom end cap 32 preferably having a pointed tip 34 to allow the transducer assembly to more easily penetrate into the marshy ground.

The entire cavity 14 is filled with a sound-transmitting, electrically-insulating, solid flexible material forming a core 15. The material should be sufficiently flexible, relatively incompressible and have a hardness in the approximate range of 40 to 90 on the Shore A scale. It should have good thermal stability between −50°F. and 200°F. Typical of sound-transmitting materials that might be employed are natural rubber, synthetic rubber, silicon rubber, urethanes, flexible epoxys, etc. In the preferred embodiment silicon rubber was employed having a hardness of 45 on the Shore A Scale, a tensile strength of 400 psi., and an elongation of 180%. The material should be water-impervious to prevent water penetration into cavity 14. Silicon rubber can be purchased as a two-part liquid. Prior to pouring into the cavity, the liquids are mixed together and the entrapped air is removed as by using vacuum techniques. Thereafter, the liquid mixture is cured using well-known methods.

The filling material should have sufficient rigidity to withstand the hydrostatic pressure to which the transducer assembly is subjected.

The material provides mechanical isolation among the elements and the electric terminals while rigidly holding the elements within the casing.

Core 15 completely fills the inner cavity and becomes exposed through the windows 16 to the outside fluid medium. There is thus established a smooth profile to the outside. Neither mud nor water can penetrate into cavity 14. Even if the filling material were cut or scratched through the windows, the operation of the hydrophone 18 would not be impaired. The hydrophone would continue to convert acoustic energy transmitted by the solid core into electric energy.

Although this invention has been described with reference to an illustrative embodiment, it will be apparent to those skilled in the art that the principles of this invention can be embodied in other forms but within the scope of the claims.

What is claimed is:

1. A seismic transducer assembly for detecting pressure variations in a surrounding liquid medium of a marshy terrain, said assembly comprising:

a flexible cable including at least a pair of electric conductors, a hollow, rigid, cylindrical casing having an inner cavity, the casing defining in its cylindrical wall a plurality of sound-transmitting windows, a substantially conically-shaped, rigid bottom end cap for the casing to assist the casing to penetrate into the ground, at least one hydrophone mounted inside said cavity and having a pair of output terminals, means in said housing for electrically coupling said terminals to said conductors, and a sound-transmitting, flexible solid core material completely filling said cavity, said material being adapted to support and protect said hydrophone against mechanical damage while solely transmitting pressure variations from said liquid medium to said hydrophone, said pressure variations becoming converted by said hydrophone into corresponding electric signals.

2. The transducer assembly of claim 1 and further comprising a top end cap for said casing, said top end cap having a center opening for receiving said cable and a strain cord portion inside said top end cap.

3. A seismic transducer assembly for detecting pressure variations in a surrounding water medium of an abrasive marshy terrain, said assembly comprising:

a hollow, rigid casing having an inner cavity, the walls in the casing defining a plurality of openings, at least one hydrophone mounted inside said cavity and having a pair of output terminals, a sound-transmitting, flexible solid core material completely filling said cavity, said material serving to (1) support said hydrophone, (2) be in direct contact with said water through said openings, and (3) solely transmit pressure variations from said water to said hydrophone for conversion by said hydrophone into corresponding electric signals on said output terminals, and cable means extending through said casing and being electrically connected to said output terminals.

* * * * *